(12) United States Patent
Lv et al.

(10) Patent No.: US 8,150,149 B2
(45) Date of Patent: Apr. 3, 2012

(54) AUTOMATIC DETERMINATION OF EXCITING SEGMENTS FROM A VIDEO

(75) Inventors: Shengmin Lv, Hangzhou (CN); Jin Wang, Hangzhou (CN)

(73) Assignee: ArcSoft, Inc., Fremont, CA (US)

( * ) Notice: Subject to any disclaimer, the term of this patent is extended or adjusted under 35 U.S.C. 154(b) by 676 days.

(21) Appl. No.: 12/269,052

(22) Filed: Nov. 12, 2008

(65) Prior Publication Data

US 2010/0119152 A1   May 13, 2010

(51) Int. Cl.
*G06K 9/34*   (2006.01)
(52) U.S. Cl. .................. 382/164; 382/173; 382/236
(58) Field of Classification Search ............. 382/103, 382/235, 164, 236, 190; 348/135, 155, 127; 209/526, 939; 375/240.05
See application file for complete search history.

(56) References Cited

U.S. PATENT DOCUMENTS 7,899,208 B2 *   3/2011   Kondo et al. ............... 382/103

\* cited by examiner

*Primary Examiner* — Anh Hong Do
(74) *Attorney, Agent, or Firm* — Patent Law Group LLP; David C. Hsia

(57) ABSTRACT

A method is provided to automatically determine "exciting" segments from a video. The method includes calculating image features of each frame in the video, determining a difference for each pair of adjacent frames, calculating a sum of differences for each group of frames in the video, and selecting a number of the groups with high sums as exciting segments of the video. The differences between pairs of adjacent frames are used as a criterion for measuring a degree of "excitement" for determining the highlights in the video.

20 Claims, 3 Drawing Sheets

AUTOMATIC DETERMINATION OF EXCITING SEGMENTS FROM A VIDEO

FIELD OF INVENTION

This invention relates to a method that automatically selects exciting segments from a video.

DESCRIPTION OF RELATED ART

When a video is received, a user may wish to preview "exciting" segments from the video. Thus, what is needed is a method to automatically determine exciting segments from a given video.

SUMMARY

In one embodiment of the invention, a method is provided to automatically determine "exciting" segments from a video. The method includes determining a difference for each pair of adjacent frames. The differences between pairs of adjacent frames are used as a criterion for measuring a degree of "excitement" for determining the highlights in the video. The method further includes calculating a sum of differences for each group of frames in the video, and selecting a number of groups with high sums as the exciting segments of the video.

In one embodiment, the differences between pairs of adjacent frames are based on an image feature that is the histogram mapping the number of pixels that fall into bins of various feature values, and the feature value of a pixel is based on the color component values of the pixel. In one embodiment, two of the selected groups are combined to form a new selected group when they overlap. In another embodiment, two of the selected groups are combined to form a new selected group when they are closer than a threshold interval and the image feature difference between the last frame of the preceding group and the first frame of the subsequent group is smaller than a threshold image feature difference.

BRIEF DESCRIPTION OF THE DRAWINGS

Use of the same reference numbers in different figures indicates similar or identical elements.

DETAILED DESCRIPTION OF THE INVENTION

Figure 1A:
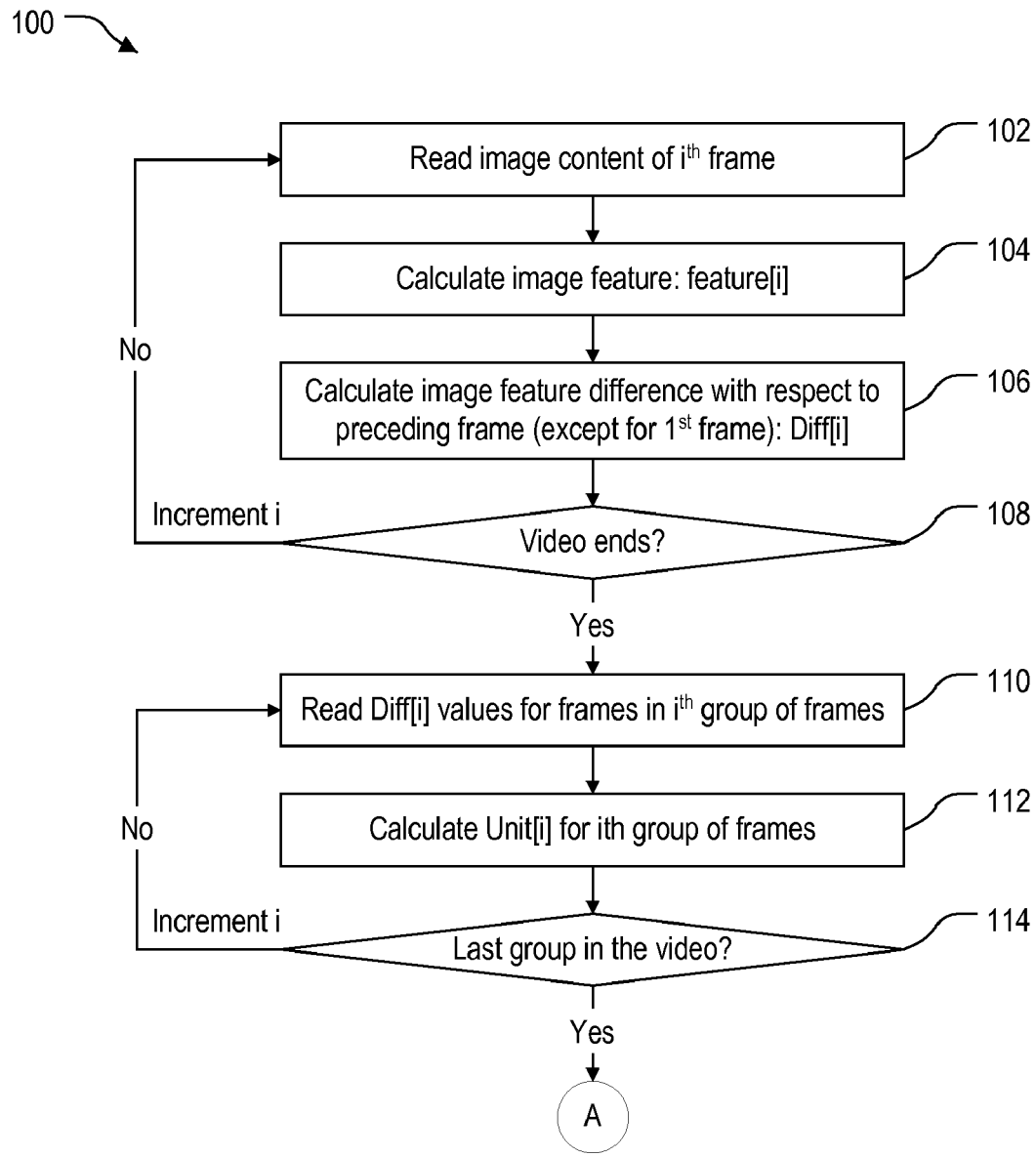
FIGS. 1A and 1B are a flowchart of a method to automatically determine highlight clips from a video in one embodiment of the invention.
Figure 1B:
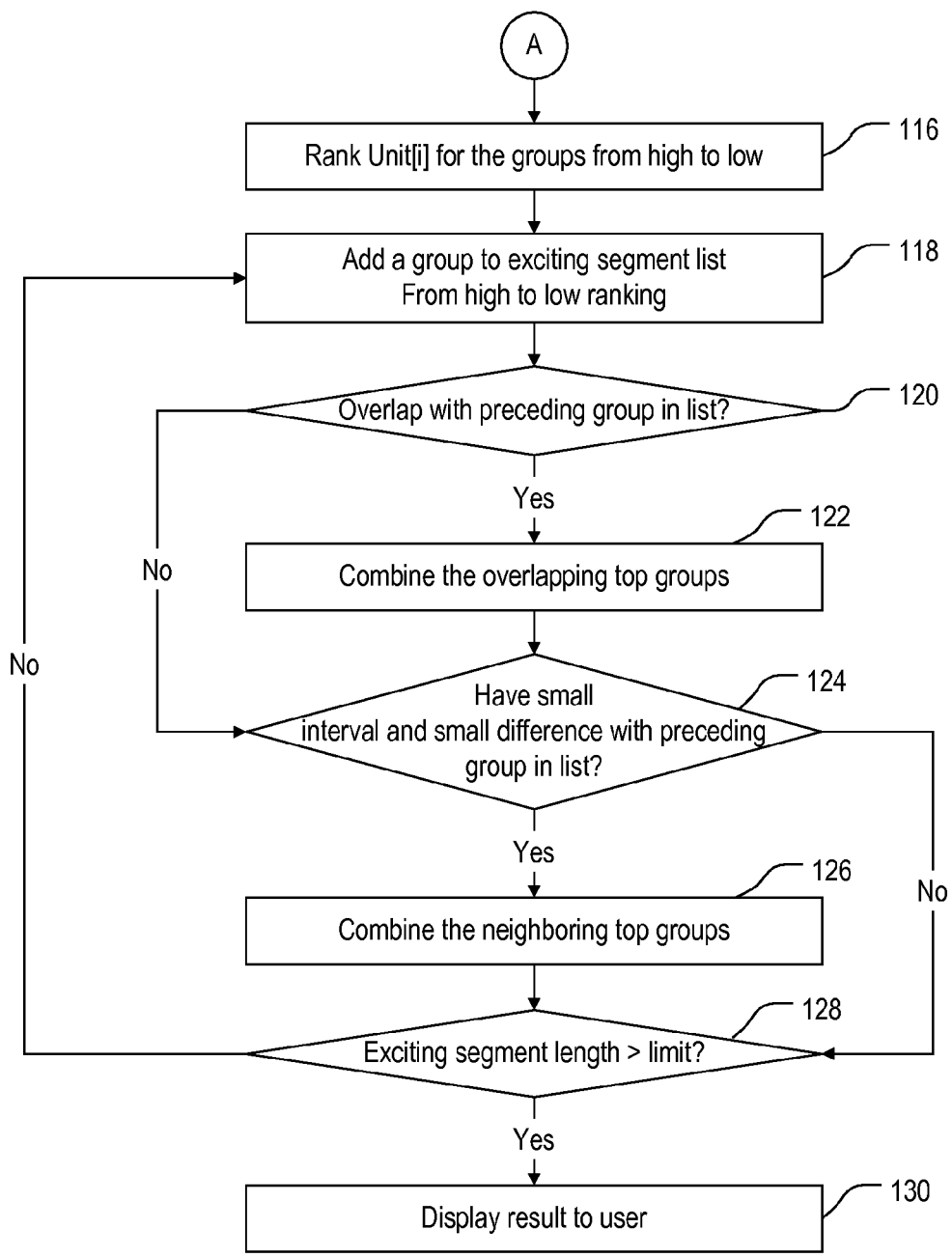

FIGS. 1A and 1B are a flowchart of a method 100 for automatically determining exciting segments in a video in one embodiment of the invention. Method 100 is implemented as software executed by a processor in a computer. Alternatively, method 100 may be implemented as software executed by a processor in a video player, completely in hardware, or other techniques known to one skilled in the art. As an example, assume the video has a length of N seconds. The user may be asked to provide a maximum length of M ($\leq$N) seconds for the exciting segments or otherwise a default value is used.

In general, the exciting segments should not be too short or otherwise they will give an overly choppy visual impression. The user may be asked to provide a minimum unit length (minThre) for the exciting segments or otherwise a default value is used.

In step 102 (FIG. 1A), the processor reads the content of an $i^{th}$ frame of the video where "i" is an integer initialized at 1. Typically the video is read from a nonvolatile memory such as a disk drive, an optical disk, or a memory card.

In step 104, the processor calculates an image feature feature[i] that characterizes the current frame. Image feature feature[i] is a histogram of the distribution of a characteristic value y of each pixel in the frame. In one embodiment, characteristic value y is a 9-bit binary number that contains the three most significant bits of the red, the green, and the blue 8-bit color components of the pixels.

The processor generates the characteristic value y as follows:

$$y=((b>>5)<<6)+((g>>5)<<3)+(r>>5), \text{ or} \qquad (1.0)$$

$$y=b8b7b6g8g7g6r8r7r6, \qquad (1.1)$$

where "r" is the red color component of the pixel, "g" is the green color component of the pixel, "b" is the blue color component of the pixel, ">>" is an arithmetic right shift operation, "<<" is an arithmetic left shift operation, b8, b7, and b6 are the most significant bits of the blue color component, g8, g7, and g6 are the most significant bits of the green color component, and r8, r7, and r6 are the most significant bits of the red color component. The processor next generates the image feature feature[i] as follows:

$$\text{feature}[i]=\{f[0],f[1],\ldots,f[511]\}, \qquad (2.0)$$

where f[k] is the number of pixels with characteristic value y value of k

In step 106, the processor calculates an image feature difference Diff[i] between the current frame and a preceding frame as follows:

$$\begin{aligned} Diff[i] &= \|\text{feature}[i] - \text{feature}[i-1]\| \\ &= \sum_{k=0}^{511} |\text{feature}[i] \cdot f[k] - \text{feature}[i-1] \cdot f[k]|, \end{aligned} \qquad (3.0)$$

where feature[i] is the histogram of the current frame, feature[i−1] is the histogram of the preceding frame, feature[i]·f[k] is the number of pixels with y value of k in the current frame, and feature[i−1]·f[k] is the number of pixels with y value of k in the preceding frame. Note that Diff[1] is defined as 0 if there is no preceding frame.

Figure 2:
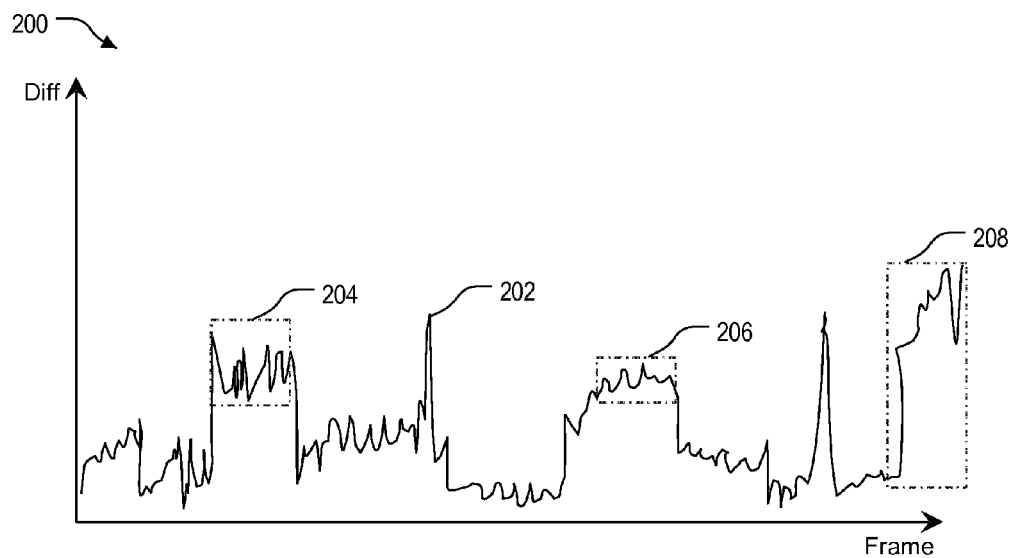
FIG. 2 is a graph of the difference between each frame and a preceding frame in a video in one embodiment of the invention.
Figure 3:
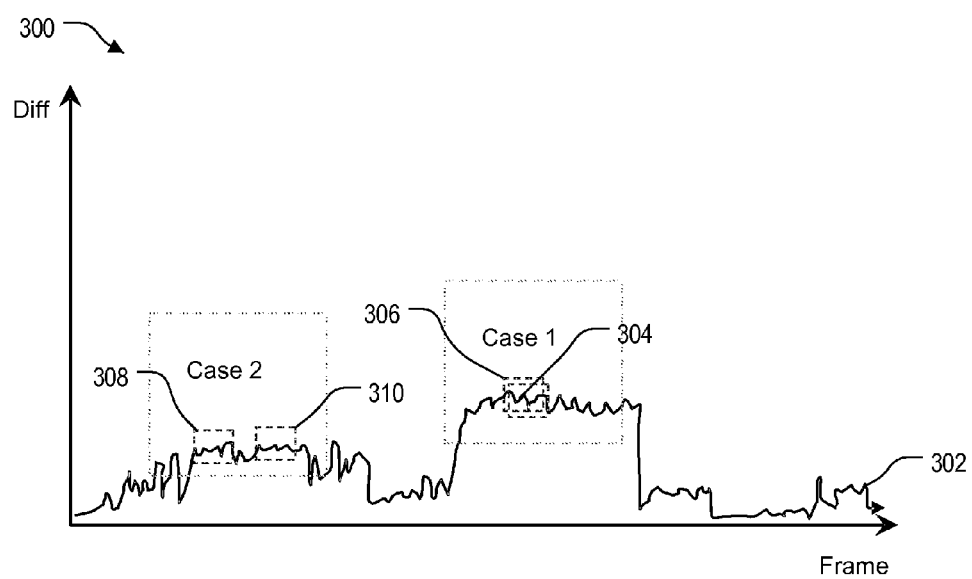
FIG. 3 is another graph of the difference between each frame and a preceding frame in another video in one embodiment of the invention.

Referring to FIG. 2, an exemplary graph 200 shows a plot 202 of the image feature difference Diff[i] along a sequence of frames in one video. Similarly, FIG. 3 shows another exemplary graph 300 with a plot 302 of the image feature difference Diff[i] along a sequence of frames in another video.

Referring back to FIG. 1A, in step 108, the processor determines if it has processed the last frame in the video. If not, then the processor increments integer i and proceeds to step 102. When the processor determines it has processed the last frame in the video, the processor proceeds to step 110.

In step 110, the processor reads the image feature difference Diff[i] values for all the frames in an $i^{th}$ group of frames where "i" is an integer initialized to 1 (remember from above that Diff[1] is defined as 0 if there is no preceding frame). The group starts at the $i^{th}$ frame in the video and includes a minimum number (minF) of frames. The processor determines the minimum number of frames from the user provided or default minimum unit time length (minThre) and the frame rate of the video.

In step 112, the processor determines the sum of all the image feature difference Diff[i] values for the frames in the current group as follows:

$$\text{Unit}[i] = \sum_{j=i}^{i+minF} \text{Diff}[j], \quad (4.0)$$

where Unit[i] is the sum of all the feature image difference Diff[j] in the $i^{th}$ group.

In step 114, the processor determines if it has processed the last group of frames in the video. If not, then the processor increments integer i and proceeds to step 110. When the processor determines it has processed the last group of frames in the video, the processor proceeds to step 116.

In step 116 (FIG. 1B), the processor ranks the sums Unit[i] of the groups of frames from high to low. From the ranking, the processor selects a set of groups that have a comparatively high degree of "excitement." For example, in FIG. 2, boxes 204, 206, and 208 identify three groups having the highest Unit[i] values. Similarly, in FIG. 3, boxes 304, 306, 308, and 310 identify four selected groups having the highest Unit[i] values.

Referring back to FIG. 1B, in step 118, the processor adds groups of frames one at a time to an exciting segment list based on high to low ranking determined in step 116.

In step 120, the processor determines if the newly added group overlaps the preceding group in the exciting segment list. If so, then step 120 is followed by step 122. When the adjacent groups do not overlap, then step 120 is followed by step 124. Note that this step is not performed for the first group since it does not have a preceding group.

In step 122, the processor combines the two groups to form a new group, and replaces the two groups in the exciting segment list with the new group. For example, referring to FIG. 3, the processor combines groups 304 and 306 to form a new group. Step 122 is followed by step 124.

In step 124, the processor determines if the newly added group and the preceding group in the exciting segment list are separated by an interval less than a predetermined interval threshold, and have an image difference Diff between the last image in the preceding group and the first image in the newly added group less than a predetermined image difference threshold. If so, then step 124 is followed by step 126. When the adjacent groups do not meet the two criteria, then step 124 is followed by step 128. Note that this step is not performed for the first group since it does not have a preceding group.

In step 126, the processor combines the two groups and includes the frames between the two groups to form a new group, and replaces the two groups in the exciting segment list with the new group. For example, referring to FIG. 3, the processor combines groups 306 and 308 to form a new group. Step 126 is followed by step 128.

In step 128, the processor determines if the total length of the exciting segments in the exciting segment list is greater than the user provided or default length M. If not, then step 128 is followed by step 118 where another group is added to the exciting segment list and the above steps are repeated. When the length of the exciting segment formed by the group of frames in the exciting segment list is greater than the user provided or default length M, the process may optionally revert to the previous exciting segment list, and step 128 is then followed by step 130.

In step 130, the processor displays the result to the user. The processor can automatically play back one or more of the exciting segments in the excitement segment list. Alternatively, the processor can display thumbnails of the exciting segments and play back one of the exciting segment selected by the user.

Various other adaptations and combinations of features of the embodiments disclosed are within the scope of the invention. As described above, there are other ways to measure image feature differences between adjacent frames that accurately reflect the variability of frame contents. For example, the image feature difference can be defined as:

$$\text{Diff}[k] = \sum_{i=1}^{W} \sum_{j=1}^{H} \|\text{color}(p_k(i, j)) - \text{color}(p_{k-1}(i, j))\|, \quad (5.0)$$

where W and H are the width and the height of video frame, color is the vector (r,g,b) made up of the components of a pixel, color($p_k(i, j)$) is the color of the pixel located (i,j) on the $k^{th}$ frame, and color($p_{k-1}(i, j)$) is the color of the pixel located (i,j) on the preceding $k-1^{th}$ frame. In equation 5.0, the characteristic value of each pixel is simply the color of the pixel. Numerous embodiments are encompassed by the following claims.

The invention claimed is:

1. A method for determining exciting segments from a video, comprising:
   for each frame in the video after a first frame of the video, determining, using a processor, a difference between the frame and a preceding frame in the video;
   determining, using the processor, a sum value of differences for a group of frames starting at the frame;
   forming, using the processor, a list of groups of frames having high sum values; and
   playing back, using the processor, at least one group of the frames from the list.

2. The method of claim 1, prior to the above steps, further comprising:
   for each frame in the video:
   for each pixel in the frame, determining a characteristic value of the pixel based on color component values of the pixel; and
   generating an image feature of the frame, wherein:
   the image feature is a histogram of characteristic values of the frame; and
   the difference between the frame and the preceding frame is between the image feature of the frame and another image feature of the preceding frame in the video.

3. The method of claim 1, wherein said forming a list of groups of frames having high sum values comprises:
   ranking groups of frames based on their sum values from high to low;
   adding high ranking groups of frames one at a time to the list based from high to low ranking; and
   when adjacent groups in the list overlap, replacing the adjacent groups in the list with a new group formed by combining the adjacent groups.

4. The method of claim 1, further comprising:
   ranking groups of frames based on their sum values from high to low;

adding high ranking groups of frames one at a time to the list from high to low ranking; and when adjacent groups are separated by less than a threshold number of frames and an image feature difference between a last frame of a first group and a first frame of a second group is less than a threshold value, replacing the adjacent groups in the list with a new group formed by combining the adjacent groups and frames between the adjacent groups.

5. The method of claim 2, wherein the characteristic value is a binary number that contains a number of most significant bits of each color component of the pixel.

6. The method of claim 5, wherein the characteristic value is defined as:

$$y=((b>>5)<<6)+((g>>5)<<3)+(r>>5),$$

where y is the characteristic value, r is a red pixel value, g is a green pixel value, b is a blue pixel value, >> is an arithmetic right shift instruction, and << is an arithmetic left shift instruction.

7. The method of claim 5, wherein the image feature of the frame is defined as:

$$feature=\{f[0],f[1],\Lambda,f[511]\},$$

where feature is the image feature, and f[k] is a number of pixels having the characteristic value y equal to k.

8. The method of claim 7, wherein the difference between the frame and the preceding frame in the video is defined as:

$$Diff[i] = \|feature[i] - feature[i-1]\|$$
$$= \sum_{k=0}^{511} |feature[i] \cdot f[k] - feature[i-1] \cdot f[k]|,$$

where Diff[i] is the difference between the frame and the preceding frame in the video, feature[i] is the image feature of the frame, feature[i−1] is the image feature of the preceding frame, feature[i]·f[k] is a number of pixels having the characteristic value y equal to k in the frame, and feature[i−1]·f[k] is a number of pixels having the characteristic value y equal to k in the preceding frame.

9. The method of claim 8, wherein the sum value of differences for the group of frames is defined as:

$$Unit[i] = \sum_{j=i}^{i+minF} Diff[j],$$

where Unit[i] is the sum value of differences for the group of frames, min F is a minimum number of frames in each group of frames, Diff[j] is the difference between a frame j and its preceding frame.

10. The method of claim 1, wherein the difference between the frame and the preceding frame in the video is defined as:

$$Diff[k] = \sum_{i=1}^{W}\sum_{j=1}^{H} \|color(p_k(i,j)) - color(p_{k-1}(i,j))\|, \quad (5.0)$$

where W and H are width and the height of the video, color $(p_k(i, j))$ is the color of a pixel located (i,j) on the frame, and color$(p_{k-1}(i, j))$ is the color of the pixel located (i,j) on the preceding frame.

11. A non-transitory computer-readable storage medium encoded with executable instructions for determining exciting segments from a video, the instructions comprising:

for each frame in the video after a first frame of the video,
determining, using a processor, a difference between the frame and a preceding frame in the video;
determining, using the processor, a sum value of differences for a group of frames starting at the frame;
forming, using the processor, a list of groups of frames having high sum values; and
playing back, using the processor, at least one group of the frames from the list.

12. The non-transitory computer-readable storage medium of claim 11, wherein the instructions further comprise, prior to the above step:

for each frame in the video:
for each pixel in the frame, determining a characteristic value of the pixel based on color component values of the pixel; and
generating an image feature of the frame, wherein:
the image feature is a histogram of characteristic values of the frame; and
the difference between the frame and the preceding frame is between the image feature of the frame and an other image feature of the preceding frame in the video.

13. The non-transitory computer-readable storage medium of claim 11, wherein said forming a list of groups of frames having high sum values comprises:

ranking groups of frames based on their sum values from high to low;
adding high ranking groups of frames one at a time to the list based from high to low ranking; and
when adjacent groups in the list overlap, replacing the adjacent groups in the list with a new group formed by combining the adjacent groups.

14. The non-transitory computer-readable storage medium of claim 11, wherein the instructions further comprise:

ranking groups of frames based on their sum values from high to low;
adding high ranking groups of frames one at a time to the list from high to low ranking; and
when adjacent groups are separated by less than a threshold number of frames and an image feature difference between a last frame of a first group and a first frame of a second group is less than a threshold value, replacing the adjacent groups in the list with a new group formed by combining the adjacent groups and frames between the adjacent groups.

15. The non-transitory computer readable storage medium of claim 12, wherein the characteristic value is a binary number that contains a number of most significant bits of each color component of the pixel.

16. The non-transitory computer readable storage medium of claim 15, wherein the characteristic value is defined as:

$$y=((b>>5)<<6)+((g>>5)<<3)+(r>>5),$$

where y is the characteristic value, r is a red pixel value, g is a green pixel value, b is a blue pixel value, >> is an arithmetic right shift instruction, and << is an arithmetic left shift instruction.

17. The non-transitory computer readable storage medium of claim 15, wherein the image feature of the frame is defined as:

$$feature=\{f[0],f[1],\Lambda,f[511]\},$$

where feature is the image feature, and f[k] is a number of pixels having the characteristic value y equal to k.

18. The non-transitory computer readable storage medium of claim 17, wherein the difference between the frame and the preceding frame in the video is defined as:

$$Diff[i] = \|\text{feature}[i] - \text{feature}[i-1]\| = \sum_{k=0}^{511} |\text{feature}[i] \cdot f[k] - \text{feature}[i-1] \cdot f[k]|,$$

where Diff[i] is the difference between the frame and the preceding frame in the video, feature[i] is the image feature of the frame, feature[i−1] is the image feature of the preceding frame, feature[i]·f[k] is a number of pixels having the characteristic value y equal to k in the frame, and feature[i−1]·f[k] is a number of pixels having the characteristic value y equal to k in the preceding frame.

19. The non-transitory computer readable storage medium of claim 18, wherein the sum value of differences for the group of frames is defined as:

$$Unit[i] = \sum_{j=i}^{i+minF} Diff[j],$$

where Unit[i] is the sum value of differences for the group of frames, min F is a minimum number of frames in each group of frames, Diff[j] is the difference between a frame j and its preceeding frame.

20. The non-transitory computer readable storage medium of claim 11, wherein the difference between the frame and the preceding frame in the video is defined as:

$$Diff[k] = \sum_{i=1}^{W} \sum_{j=1}^{H} \|\text{color}(p_k(i,j)) - \text{color}(p_{k-1}(i,j))\|, \quad (5.0)$$

where W and H are width and the height of the video, color $(p_k(i, j))$ is the color of a pixel located (i,j) on the frame, and color$(p_{k-1}(i, j))$ is the color of the pixel located (i,j) on the preceding frame.

* * * * *

UNITED STATES PATENT AND TRADEMARK OFFICE
CERTIFICATE OF CORRECTION

PATENT NO. : 8,150,149 B2
APPLICATION NO. : 12/269052
DATED : April 3, 2012
INVENTOR(S) : Shengmin Lv and Jin Wang It is certified that error appears in the above-identified patent and that said Letters Patent is hereby corrected as shown below:

Column 5,

Line 23, Claim 7, where "*feature* = {$f[0], f[1], \Lambda, f[511]$})," should read --*feature* = {$f[0], f[1], \cdots, f[511]$},--.

Column 6,

Line 66, Claim 17, where "*feature* = {$f[0], f[1], \Lambda, f[511]$})," should read --*feature* = {$f[0], f[1], \cdots, f[511]$},--.

Signed and Sealed this
Twelfth Day of June, 2012

David J. Kappos
*Director of the United States Patent and Trademark Office*